United States Patent
Roger et al.

(10) Patent No.: US 10,802,134 B2
(45) Date of Patent: Oct. 13, 2020

(54) METHOD AND DEVICE FOR PROCESSING RADAR SIGNALS

(71) Applicant: Infineon Technologies AG, Neubiberg (DE)

(72) Inventors: Andre Roger, Munich (DE); Herbert Jaeger, Linz (AT); Farhan Bin Khalid, Munich (DE); Romain Ygnace, Brunnthal (DE)

(73) Assignee: Infineon Technologies AG (DE)

( * ) Notice: Subject to any disclaimer, the term of this patent is extended or adjusted under 35 U.S.C. 154(b) by 377 days.

(21) Appl. No.: 15/944,902

(22) Filed: Apr. 4, 2018

(65) Prior Publication Data

US 2018/0284258 A1    Oct. 4, 2018

(30) Foreign Application Priority Data

Apr. 4, 2017    (DE) .................. 10 2017 107 212

(51) Int. Cl.
*G01S 13/87*    (2006.01)
*G01S 13/34*    (2006.01)
(Continued)

(52) U.S. Cl.
CPC ............ *G01S 13/872* (2013.01); *G01S 7/352* (2013.01); *G01S 13/003* (2013.01);
(Continued)

(58) Field of Classification Search
CPC ...... G01S 13/003; G01S 13/87; G01S 13/325; G01S 13/343; G01S 7/352; G01S 13/872; G01S 13/931; G01S 2007/356
(Continued)

(56) References Cited

U.S. PATENT DOCUMENTS 7,330,697 B1 *    2/2008  Bolt ............... H04W 16/10
                                                455/63.1
7,330,698 B1 *    2/2008  Bolt ............... H04W 16/10
                                                455/63.1
(Continued)

FOREIGN PATENT DOCUMENTS

WO    WO-2012164898 A1 *  12/2012  ............ G01S 7/023
WO    WO-2013083269 A2 *   6/2013  ........... G01S 13/003
(Continued)

*Primary Examiner* — Peter M Bythrow
*Assistant Examiner* — Nuzhat Pervin
(74) *Attorney, Agent, or Firm* — Design IP (57) ABSTRACT

A method for processing radar signals includes emitting a first radar signal via a transmitting antenna of a first radar unit, where the first radar signal is phase modulated using a first code and a first frequency offset is added to at least a portion of the first radar signal, and emitting a second radar signal via a transmitting antenna of a second radar unit, where the second radar signal is phase modulated using a second code. The first code and the second code are orthogonal to each other and the first radar unit and the second radar unit are loosely coupled with each other. The method further includes receiving a combined radar signal via a receiving antenna of the first radar unit, where the combined radar signal comprises a reflections of the first and the second radar signals, and processing the combined radar signal at the first radar unit.

16 Claims, 6 Drawing Sheets

(51) Int. Cl.
  *G01S 13/931* (2020.01)
  *G01S 13/32* (2006.01)
  *G01S 13/00* (2006.01)
  *G01S 7/35* (2006.01)

(52) U.S. Cl.
  CPC .......... *G01S 13/325* (2013.01); *G01S 13/343* (2013.01); *G01S 13/87* (2013.01); *G01S 13/931* (2013.01); *G01S 2007/356* (2013.01)

(58) Field of Classification Search
  USPC .......................................................... 342/43
  See application file for complete search history.

(56) References Cited

U.S. PATENT DOCUMENTS

| | | | | |
|---|---|---|---|---|
| 7,333,455 B1* | 2/2008 | Bolt | ........................ | H04B 7/10 370/329 |
| 7,469,013 B1* | 12/2008 | Bolt | ...................... | H04L 1/0003 375/260 |
| 9,841,498 B1* | 12/2017 | Campbell | ................. | G01S 7/41 |
| 9,933,520 B1* | 4/2018 | Campbell | ............... | G01S 13/42 |
| 2003/0090406 A1* | 5/2003 | Longstaff | ............... | G01S 13/88 342/22 |
| 2003/0151542 A1* | 8/2003 | Steinlechner | ......... | G01S 13/222 342/70 |
| 2003/0184469 A1* | 10/2003 | Brosche | ................ | G01S 13/325 342/70 |
| 2013/0129026 A1* | 5/2013 | Petersen | ................. | G01S 11/08 375/371 |
| 2013/0169471 A1* | 7/2013 | Lynch | ................... | G01S 13/343 342/107 |
| 2013/0241766 A1* | 9/2013 | Kishigami | ............ | G01S 7/2813 342/159 |
| 2013/0293410 A1* | 11/2013 | Hieronimi | ............... | G01S 13/74 342/190 |
| 2014/0085128 A1* | 3/2014 | Kishigami | ............ | G01S 13/878 342/118 |
| 2014/0362891 A1* | 12/2014 | Hiscock | ................ | H04L 27/103 375/139 |
| 2015/0159632 A1* | 6/2015 | Vangen | ..................... | F03D 7/04 416/61 |
| 2015/0168535 A1* | 6/2015 | Huttner | ................... | G01S 13/82 342/147 |
| 2016/0124075 A1* | 5/2016 | Vogt | ...................... | G01S 13/325 342/13 |
| 2017/0176583 A1* | 6/2017 | Gulden | ................... | G01S 13/34 |
| 2017/0212213 A1* | 7/2017 | Kishigami | ............. | G01S 13/04 |

FOREIGN PATENT DOCUMENTS

WO  WO-2013141924 A2 * 9/2013 ............... G01S 3/72
WO  WO-2015144134 A2 * 10/2015 ............. G01S 13/10

* cited by examiner

METHOD AND DEVICE FOR PROCESSING RADAR SIGNALS

BACKGROUND

Embodiments relate to a method for processing signals of loosely coupled radar units and to a corresponding devices or systems.

Processing radar signals in this regard in particular refers to radar signals received by a sensor or an antenna.

Several radar variants are used in vehicles for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

SUMMARY

A first embodiment relates to a method for processing radar signals. The method includes emitting a first radar signal via a transmitting antenna of a first radar unit, wherein the first radar signal is phase modulated using a first code and wherein a first frequency offset is added to at least a portion of the first radar signal; emitting a second radar signal via a transmitting antenna of a second radar unit, wherein the second radar signal is phase modulated using a second code; wherein the first code and the second code are orthogonal to each other, wherein the first radar unit and the second radar unit are loosely coupled with each other; receiving a combined radar signal via a receiving antenna of the first radar unit, wherein the combined radar signal includes a reflection of the first radar signal and the second radar signal; and processing the combined radar signal at the first radar unit.

A second embodiment relates to a device for processing a combined radar signal. The device includes a transmitting antenna; a receiving antenna; a processing unit, wherein the processing unit is configured to emit a first radar signal via the transmitting antenna, wherein a first frequency offset is added to at least a portion of the first radar signal and wherein the first radar signal is phase modulated using a first code, to receive a combined radar signal via the receiving antenna, wherein the combined radar signal includes a reflection of the first radar signal and a second radar signal, wherein the second radar signal was emitted by a transmitting antenna of another radar unit, wherein the device and the other radar unit are loosely coupled with each other, and to process the combined radar signal by conducting a phase demodulation using the first code and by conducting a phase demodulation using the second code.

A third embodiment relates to a system for processing radar signals. The system includes a first radar unit that is arranged for emitting a first radar signal via its transmitting antenna, wherein the first radar signal is phase modulated using a first code and wherein a first frequency offset is added to at least a portion of the first radar signal; and a second radar unit that is arranged for emitting a second radar signal via its transmitting antenna, wherein the second radar signal is phase modulated using a second code, wherein the first code and the second code are orthogonal to each other, and wherein the first radar unit and the second radar unit are loosely coupled with each other. The first radar unit is configured to receive a combined radar signal via its receiving antenna, wherein the combined radar signal includes a reflection of the first radar signal and the second radar signal, and to process the combined radar signal at the first radar unit.

A fourth embodiment relates to a computer program product directly loadable into a memory of a digital processing device, including software code portions for performing the steps of the method as described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

In a radar processing environment, a radar source emits a signal and a sensor detects a returned signal. The returned signal may be acquired in a time domain by at least one antenna, in particular by several antennas. The returned signal may then be converted into the frequency domain by conducting a Fast Fourier Transform (FFT), which may result in a signal spectrum, i.e. a signal distributed across the frequency. Frequency peaks may be used to determine potential targets, e.g., along a moving direction of a vehicle.

A Discrete Fourier Transform (DFT) may be implemented in computers by numerical algorithms or dedicated hardware. Such implementation may employ FFT algorithms. Hence, the terms "FFT" and "DFT" may be used interchangeably.

A loosely synchronized FMCW (frequency modulated continuous wave) radar includes several radar units, wherein each radar unit has a transmitter and a receiver. The radar units are loosely coupled (i.e. they do not share a common clock signal of, e.g., a local oscillator), but need to be synchronized in order to avoid large frequency offsets between the radar units. Each of the radar units may acquire and process data. The data supplied by the radar units lead to a combined high resolution processing.

Examples described herein in particular refer to an efficient acquisition and data (pre)processing approach considering also a cross-path (or cross-signal) from the respective other radar unit. Hence, an extraction of such cross-signals may be efficiently combined with post processing techniques.

Figure 1:
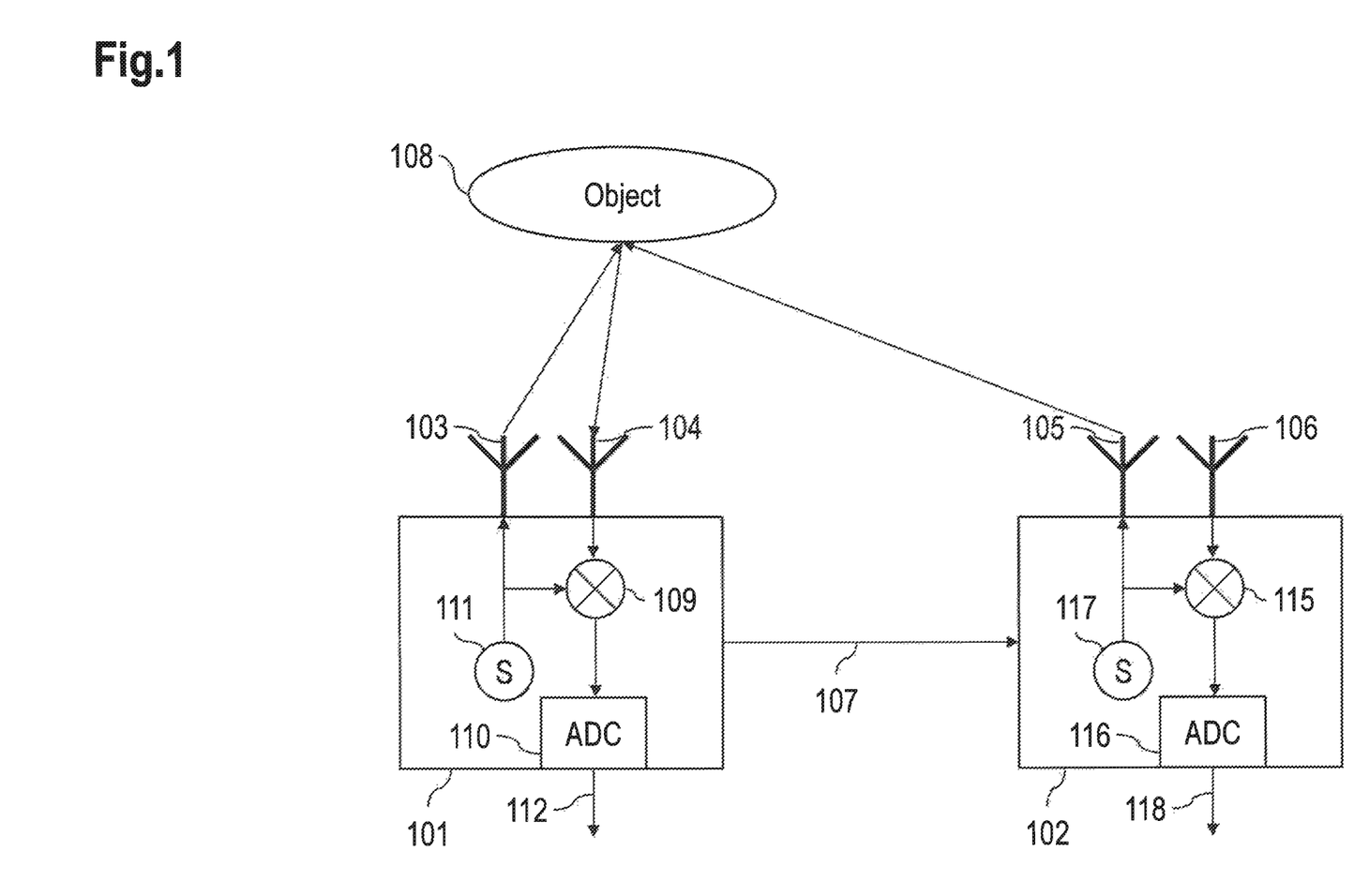
FIG. 1 shows an example of two radar units, which are loosely coupled via a communication line according to one or more embodiments.

FIG. 1 shows an example of two radar units 101 and 102, which are loosely coupled via a communication line 107.

The radar unit 101 has a transmitting antenna 103 and a receiving antenna 104. Also, the radar unit 102 has a transmitting antenna 105 and a receiving antenna 106.

The communication line 107 is used for the radar unit 101 to trigger the radar unit 102, i.e. initiating the transmission via the transmitting antenna 105 at the radar unit 102.

In this example it is shown that the radar unit 101 via its transmitting antenna 103 transmits a signal towards an object 108; the signal is (partially) reflected at the object 108 and the reflected signal is received at the receiving antenna 104 of the radar unit 101. Also, the radar unit 102 via its transmitting antenna 105 transmits a signal towards the object 108, which is (partially) reflected and the reflected signal is received at the receiving antenna 104 of the radar unit 101. In other words, the reflected signals transmitted from the transmitting antennas 103 and 105 are received at the receiving antenna 104 of the radar unit 101.

The reflected signal transmitted by the transmitting antenna 105 of the radar unit 102, which is received at the receiving antenna 104 of the radar unit 101, is also referred to as cross-signal or cross-path-signal.

This cross-signal contributes to the overall resolution information and allows for a higher resolution compared to only the signal transmitted from the transmitting antenna 103 of the radar unit 101.

The radar unit 101 includes a mixer 109, a signal source 111 and an ADC 110 (ADC: analog-to-digital converter). The signal source 111 compiles the radar signal to be transmitted via the transmitting antenna 103. Also, this signal is fed to the mixer 109. The signal received at the receiving antenna 104 is also fed to the mixer 109. The signal at the output of the mixer 109 has an intermediate frequency (IF) including signals from the direct path (i.e. transmitted by the radar unit 101) and from the cross-path (i.e. transmitted by the radar unit 102). The output of the mixer 109 is fed to the ADC 110, which provides a digital signal 112 that is subject to further processing. It is noted that the ADC 110 may be part of the radar unit 101 or it may be external to this radar unit 101.

The radar unit 102 may also include a mixer 115, a signal source 117 and an ADC 116. The signal source 117 compiles the radar signal to be transmitted via the transmitting antenna 105. Also, this signal is fed to the mixer 115. The signal received at the receiving antenna 106 is also fed to the mixer 115. The signal at the output of the mixer 115 is fed to the ADC 116, which provides a digital signal 118 that is subject to further processing. It is noted that the ADC 116 may be part of the radar unit 102 or it may be external to this radar unit 102.

A general motivation is to process the combined signal (i.e. the signal supplied at the output of the mixer 109) in an efficient way. It is in particular a motivation to split this signal such that the direct path signal and the cross-signal are separated in an efficient manner.

According to an exemplary embodiment, an acquisition signal (here: via the communication line) is used for synchronization purposes between the radar units 101 and 102. Such synchronization ensures that a delay between chirp signals of the radar units 101 and 102 remains substantially the same (or they may remain within a predetermined range).

In addition, a phase shift is introduced: Hence, one of the radar units 101, 102 may emit radar signals that are intentionally phase shifted compared to the radar signals emitted by the respective other radar unit 102, 101. The phase shift may be a positive or a negative phase shift. The phase shift may thus result in the fact that the radar unit 101 and the radar unit 102 each emits signals that are orthogonal to each other. Hence, a first code (also referred to a pseudo random noise code) is applied to the signal emitted by the radar unit 101 and a second code (also a pseudo random noise code) is applied to the signal emitted by the radar unit 102, wherein the first code and the second code are orthogonal to each other.

Also, the radar signals emitted by the radar unit 101 may use a predetermined frequency offset that is added to a selection of the chirps (e.g., to every second chirp).

In other words, the signals transmitted via the transmitting antennas 103 and 105 of the radar units 101 and 102 are orthogonal (i.e. they are phase-modulated using orthogonal codes), which enables a separation of the received signals by decoding (demodulating) the digital signal 112.

Figure 2:
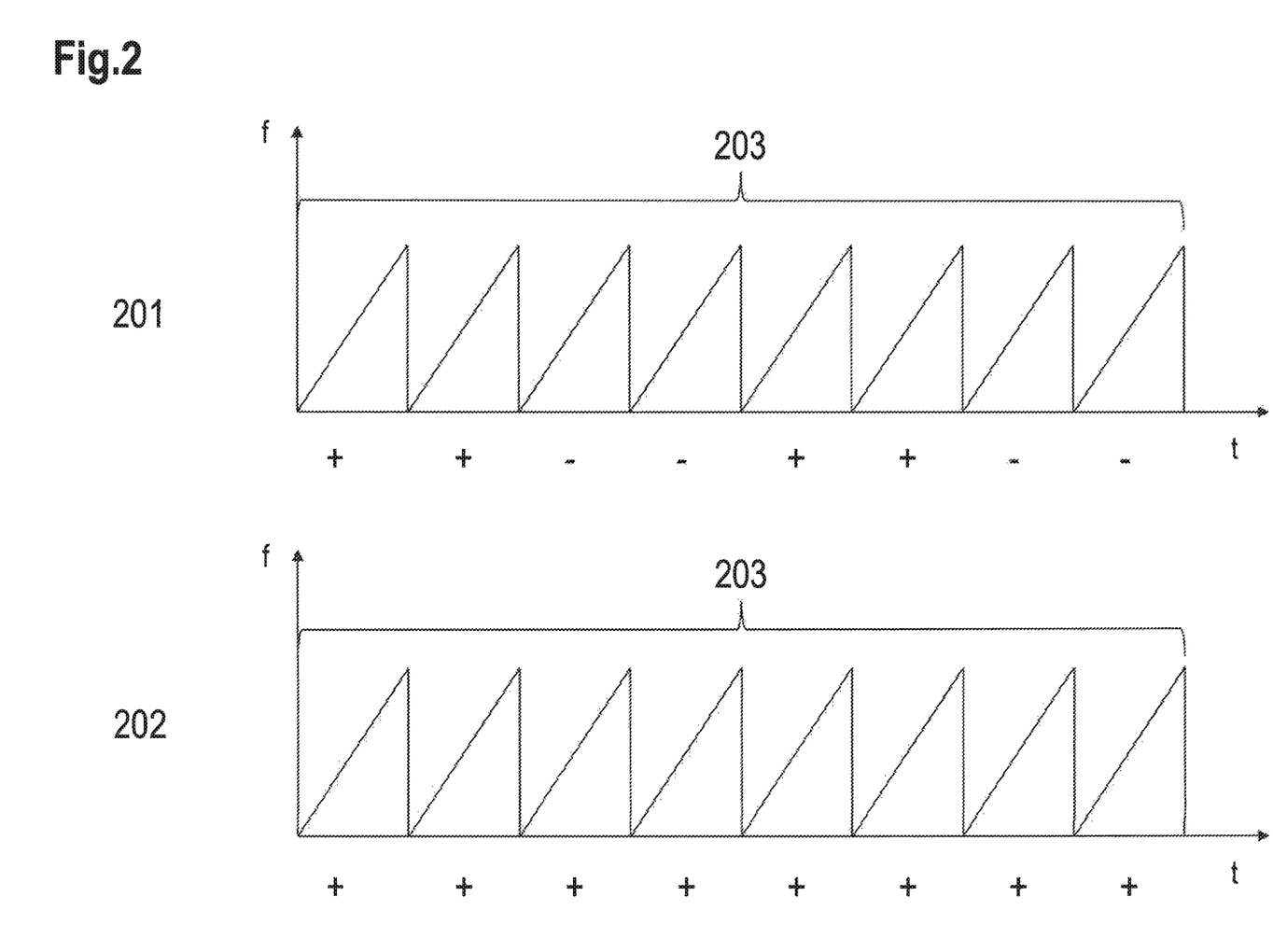
FIG. 2 shows a schematic diagram including signals emitted by the transmitting antennas of the radar units according to one or more embodiments.

FIG. 2 shows a schematic diagram including a signal 201 emitted by the antenna 103 of the radar unit 101 and a signal 202 emitted by the antenna 105 of the radar unit 102.

Each signal 201 and 202 includes eight ramps (each ramp is also referred to as chirp), wherein each ramp has a linear rising slope of frequency f over time t. The eight ramps correspond to an acquisition period 203.

A symbol "+" or "−" below each of the ramps indicates, e.g., a phase shift amounting to 0° ("+") or phase shift amounting to 180° ("−") of the respective ramp. Because of the phase shifts, the signal 201 and the signal 202 are orthogonal to each other.

Figure 3:
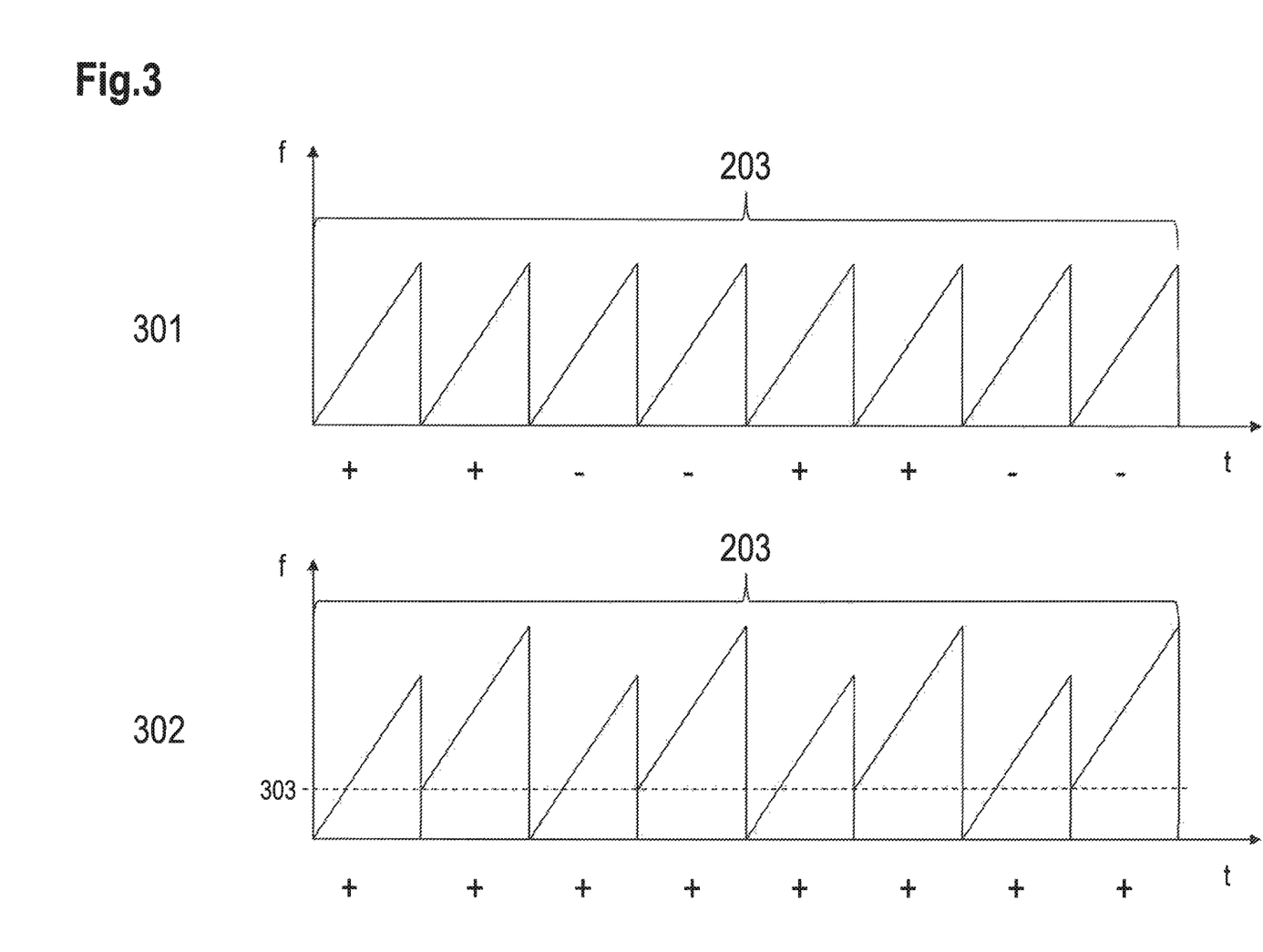
FIG. 3 shows a schematic diagram including signals emitted by the transmitting antennas of the radar units, wherein to a portion of one of the signals a frequency offset is added according to one or more embodiments.

FIG. 3 shows a schematic diagram including a signal 301 emitted by the antenna 103 of the radar unit 101 and a signal 302 emitted by the antenna 105 of the radar unit 102.

The signal 301 is identical to the signal 201. The signal 302, however shows a frequency offset 303 added to every second ramp of the signal 202.

This, however, is an example. A first frequency offset may be added to a first selection of ramps and a second offset may be added to a second selection of ramps. It is also an option to use more than two selections of ramps and add at least one offset or no offset to each of the selections. It is also an option that the changes are not applied on each ramp.

Hence, according to the example shown in FIG. 3, the relative frequency offset between the radar units 101 and 102 are changed regularly such that when the synchronization delay between the two radar units is taken into account, every two ramps one of the radar units emits a ramp at a higher frequency than the other radar unit.

Figure 4:
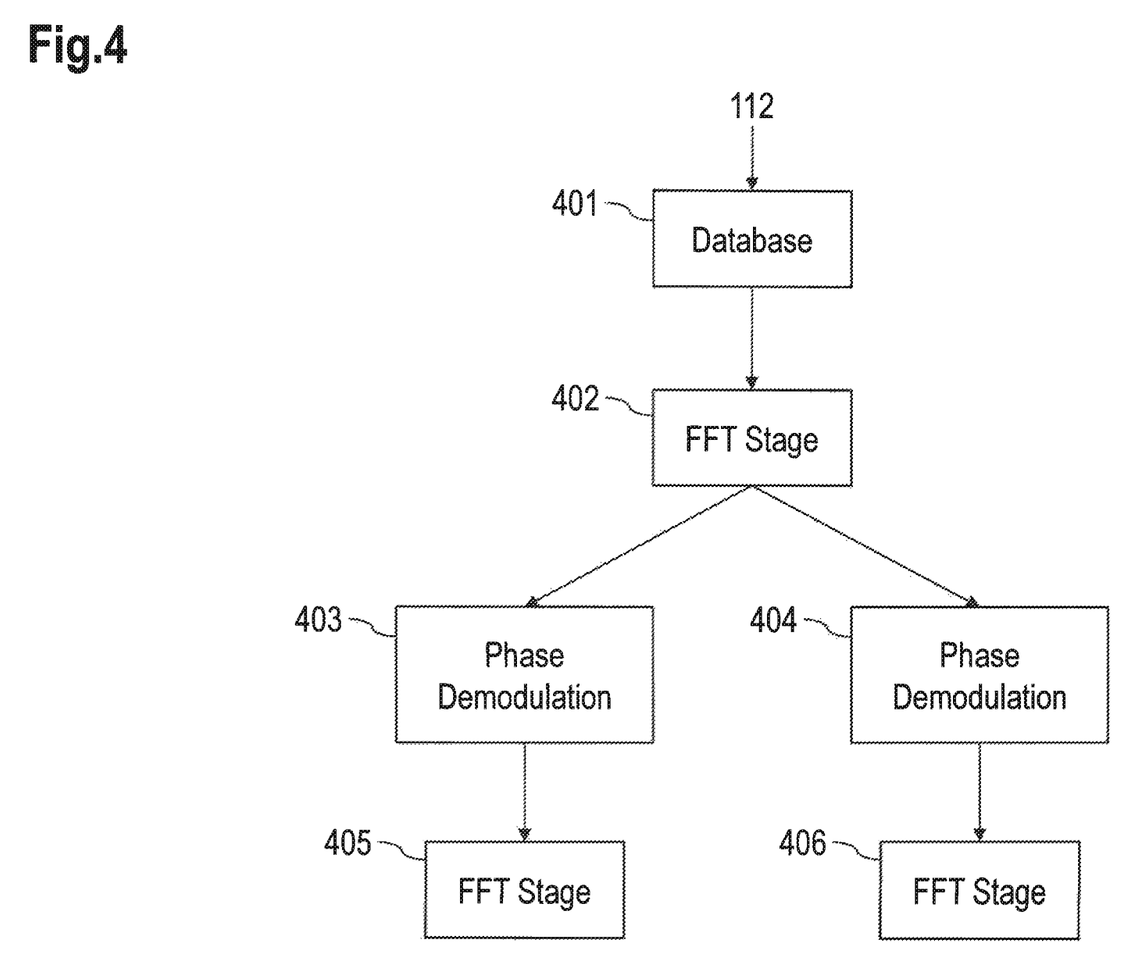
FIG. 4 shows an exemplary arrangement of how the digital signal provided by the radar unit may be processed according to one or more embodiments.

FIG. 4 shows an exemplary arrangement of how the digital signal 112 provided by the radar unit 101 may be processed.

The digital signal 112 is fed to a database 401 that stores raw data (e.g., in a time domain). A first stage FFT (FFT: Fast Fourier Transform) is conducted in a FFT stage 402. The result of the FFT stage 402 is fed to a phase demodulation unit 403 and to a phase demodulation unit 404. The phase demodulation unit 403 uses the orthogonal code applied to the signal 301 and the phase demodulation unit 404 uses the orthogonal code applied to the signal 302.

The output of the phase demodulation unit 403 is fed to a FFT stage 405 and the output of the phase demodulation unit 404 is fed to a FFT stage 406. The FFT stage 405, 406 may each conduct a second stage FFT.

The phase demodulation units 403 and 404 allow separating the spectra of the signals received from the first radar unit 101 and the second radar unit 102.

It is noted that a separation of the signals may be conducted, e.g., before or after the first stage FFT or after the second stage FFT.

The solution presented herein allows separating the spectrum of the primary signal from the spectrum of the cross-path signal while (substantially) avoiding to physically allocate part of the spectrum to the primary signal and another part to the spectrum of the cross-path signal.

Another advantage of the solution is the separation achieved by the phase demodulation 403 and 404 thereby allowing to obtain separable range information based on the different signals that are part of the digital signal 112.

An example might be as follows: Each ramp has a duration of 30 μs. A bandwidth of the frequency sweep of the ramp may be 4 GHz. A synchronization delay due to the loosely coupled radar units 101, 102 may amount to 20 ns. This results to a lost IF amounting to ca. 2.6 MHz (i.e. 4 GHz divided by 30 μs results in ca. 133 MHz per microsecond, i.e. ca. 0.133 MHz per nanosecond, hence for 20 ns the frequency amounts to ca. 2.6 MHz). This lost IF is independent of the total IF.

Figure 5:
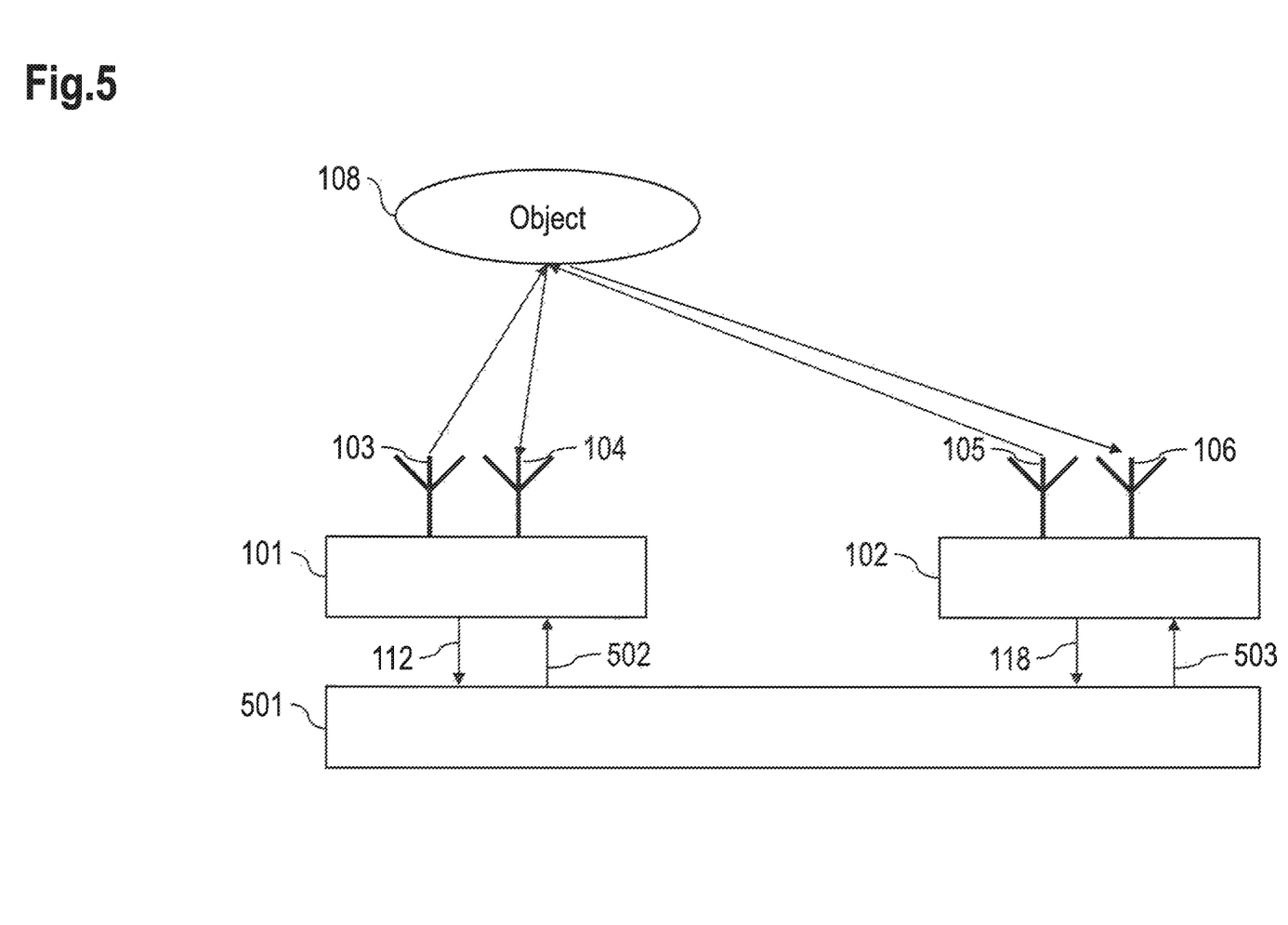
FIG. 5 shows a schematic diagram of two radar units that are connected to a (central) electronic control unit (ECU) according to one or more embodiments.

FIG. 5 shows a schematic diagram of two radar units 101 and 102 that are connected to a (central) electronic control unit (ECU) 501.

Instead of the acquisition start (trigger) conveyed across the communication line 107 (as shown in FIG. 1), the acquisition start is conveyed from the ECU 501 to the radar unit 101 via a signal 502 and to the radar unit 102 via a signal 503.

It is noted that there might be a bidirectional communication link between the ECU 501 and the radar unit 101 and between the ECU 501 and the radar unit 102.

The ECU 501 may thus generate the acquisition start (trigger) and convey it at the same time or substantially at the same time towards the radar units 101, 102.

Depending on the sampling of this acquisition start signal 502, 503, there will be a delay in the range 0 . . . k ns (nanoseconds). The delay depends on the time required to sample and process the acquisition start signal 502, 503 at the respective radar unit 101, 102.

It is also an option that the radar units 101, 102 include different components or may even be of different structure. This may also contribute to a delay, which may in particular be different between the radar units 101, 102.

The delay between the emission of the signals 502 and 503 and the actual emission of the generated radar signals at the radar units 101 and 102 may be considered for adjusting the frequency offset(s):

For example, a minimum frequency offset $f_{off\_1}$ for the radar unit 101 may be set to:

$$f_{off\_1} = \frac{BW}{rp} \cdot \frac{y}{1000}$$

and a minimum frequency offset $f_{off\_2}$ for the radar unit 102 may be set to:

$$f_{off\_2} = \frac{BW}{rp} \cdot \frac{x}{1000},$$

wherein:
BW indicates a bandwidth of the chirp,
rp indicates a ramp-period (i.e. the duration of the chirp),
x denotes a sampling delay at the radar unit 101, and
y denotes a sampling delay at the radar unit 102.

It is noted that alternating frequency offsets may be used.

It is further noted that the frequency offsets $f_{off\_1}$ and $f_{off\_2}$ may be chosen such that the IF of the cross-signal (from the respective other radar unit) is always positive over the (entire) spectrum of the cross-path IF.

In the example shown herein, 50% of the ramps allow to create the cross-path signal on one radar unit and the other 50% of the ramps allow to create the cross-path on the other radar unit.

If the ramps transmitted via the antenna 103 and the antenna 105 have a frequency offset and if the ramps transmitted via the antenna 105 have the highest frequency, the signals received at each of the receiving antennas 104 and 106 is processed two times: the received signal is demodulated (decoded) using the orthogonal code for the signal emitted by the radar unit 101, and the received signal is demodulated (decoded) using the orthogonal code for the signal emitted by the radar unit 102.

Although the spectra of the two radar units 101, 102 overlap, the demodulation via the different orthogonal codes allow to filter out the respective signals emitted by the radar unit 101 and the radar unit 102, i.e. in particular to obtain the cross-signal without information from the primary path.

Advantageously, the solution presented does not require dedicated physical spectrum allocation for each of the signals received at the radar unit. The full IF (except for the IF portion lost in synchronization) is available for each path received (be it the primary path or the cross-path). Physical spectrum allocation is based on dividing the spectrum in several parts and organizing the frequency offset and delay of each radar unit to define which radar unit is using which part of the frequency spectrum.

It is an option to conduct the phase demodulation after a first stage FFT or after a second stage FFT.

Advantageously, the approach provided herein utilizes synchronized orthogonal phase modulation on each radar unit to enable a removal of an unwanted portion of each spectrum during processing of received signals such that loosely coupled radar units become virtually coupled.

A delay between the two radar units 101, 102 has an immediate influence on the IF. For example, if the radar unit 101 is emitting a radar signal that is received at the receiving antenna 106 of the radar unit 102, the IF received from this cross-path has the same sign.

Figure 6:
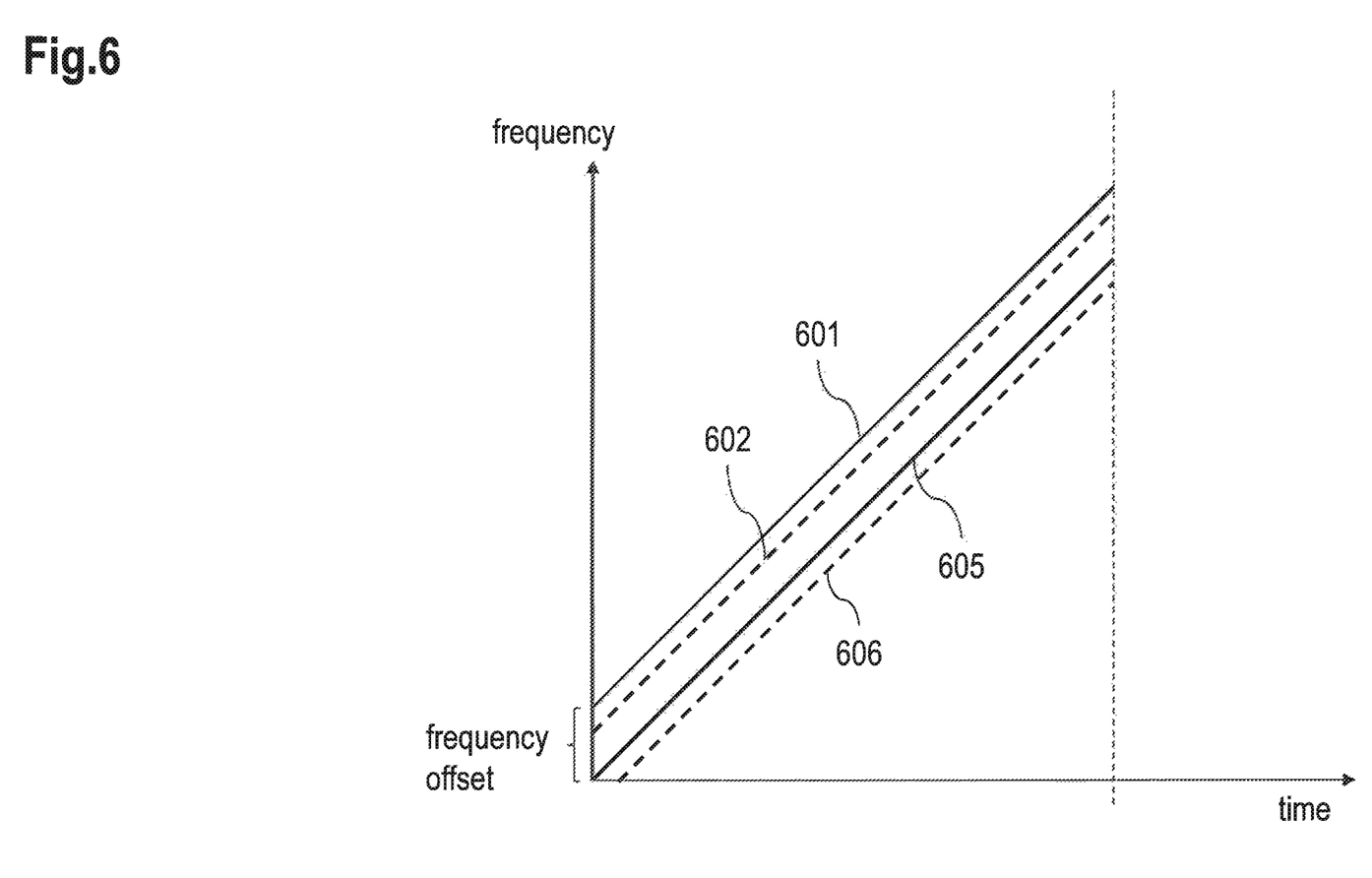
FIG. 6 shows a frequency-over-time diagram depicting increasing slopes of radar signals according to one or more embodiments.

FIG. 6 shows a frequency-over-time diagram depicting increasing slopes of radar signals. A curve 601 shows the signal transmitted by the transmitting antenna 103 and a curve 605 shows the signal transmitted by the transmitting antenna 105.

A (dashed) curve 602 shows the signal received at the receiving antenna 104 and a (dashed) curve 606 shows the signal received at the receiving antenna 106. A frequency shift towards lower frequencies will occur for both curves 602 and 606 in case the range to the object 108 increases.

Considering a reception at the radar unit 102: A reference signal to create the intermediate frequency (IF) is the signal 605 emitted by the transmitting antenna 105. Using this signal 605 as a reference signal may be problematic in case the range between the object 108 and the radar unit 102 increases such that the frequency of the curve 602 shifts below the signal 605 such that the IF changes sign thereby creating range ambiguities when processing the corresponding FFT results.

Considering a reception at the radar unit 101: A reference signal to create the IF is the signal 601 emitted by the transmitting antenna 103. Using this signal 601 as reference signal is beneficial, because in case the range between the object 108 and the radar unit 101 increases such that the frequency of the curve 606 sifts towards lower frequencies, there will be no such ambiguity.

This is the reason for the chance of the frequency offset during the acquisition period: Hence, by changing the frequency offset during the acquisition periods (at the radar units 101 and 102), the ambiguity described above can be avoided. By changing the frequency offset between chirps so that the cross-path signal is received only at one radar unit per chirp and by providing an alternating offset it can be ensured that each radar unit has enough energy for signal post processing purposes.

The examples suggested herein may in particular be based on at least one of the following solutions. In particular combinations of the following features could be utilized in order to reach a desired result. The features of the method could be combined with any feature(s) of the device, apparatus or system or vice versa.

A method for processing radar signals is provided, the method includes emitting a first radar signal via a transmitting antenna of a first radar unit, wherein the first radar signal is phase modulated using a first code and wherein a first frequency offset is added to at least a portion of the first radar signal; emitting a second radar signal via a transmitting antenna of a second radar unit, wherein the second radar signal is phase modulated using a second code, wherein the first code and the second code are orthogonal to each other, and wherein the first radar unit and the second radar unit are loosely coupled with each other; receiving a combined radar signal via a receiving antenna of the first radar unit, wherein the combined radar signal includes a reflection of the first radar signal and the second radar signal; and processing the combined radar signal at the first radar unit.

The phase modulation may be achieved by providing a phase shift amounting to a predetermined amount, e.g., 0° or 180°. For example, two orthogonal codes represented by "0" and "1" values may be used, wherein a "0" represents the phase shift of 0° and a "1" represents a phase shift of 180°.

The first frequency offset may be added, e.g., to every second chirp of the first radar signal.

The radar units are loosely coupled if they do not share a common clock signal of, e.g., a local oscillator, but still need to be synchronized in order to avoid large frequency offsets between the radar units. Each of the radar units may acquire and process data. The data supplied by the radar units lead to a combined high resolution processing.

According to an embodiment, the first radar signal includes a predetermined number of chirps, wherein the first frequency offset is added to a selection of these chirps.

According to an embodiment, a second frequency offset is added to at least a portion of the second radar signal.

According to an embodiment, the second radar signal includes a predetermined number of chirps, wherein the second frequency offset is added to a selection of these chirps.

In an embodiment, the first frequency offset is set such that an intermediate frequency of the second radar signal is always positive over the entire spectrum of the cross path intermediate frequency.

In an embodiment, processing the combined radar signal at the first radar unit includes: converting the combined radar signal into a digital signal; conducting a FFT; conducting a phase demodulation using the first code; and conducting a phase demodulation using the second code.

In an embodiment, the FFT is a first stage FFT.

In an embodiment, processing the combined radar signal at the first radar unit further includes: conducting a second stage FFT based on the output provided by the phase demodulation using the first code; and conducting the second stage FFT based on the output provided by a phase demodulation using the second code.

In an embodiment, an acquisition phase of the second radar unit is triggered via a signal conveyed from the first radar unit to the second radar unit.

In an embodiment, an acquisition phase of the first radar unit and of the second radar unit is triggered via a signal conveyed from an electronic control unit.

Also, a device for processing a combined radar signal is suggested, the device includes a transmitting antenna and a receiving antenna; and a processing unit, wherein the processing unit is arranged for emitting a first radar signal via the transmitting antenna, wherein a first frequency offset is added to at least a portion of the first radar signal and wherein the first radar signal is phase modulated using a first code; for receiving a combined radar signal via the receiving antenna, wherein the combined radar signal includes a reflection of the first radar signal and a second radar signal, wherein the second radar signal was emitted a transmitting antenna of another radar unit, wherein the device and the other radar unit are loosely coupled with each other; and for processing the combined radar signal by conducting a phase demodulation using the first code and by conducting a phase demodulation using the second code.

It is noted that the transmitting antenna and the receiving antenna may be realized by a single antenna structure or by at least two separate antennas.

It is noted that all features described with regard to the method may be applicable for the other embodiments directed to the device, the system or the computer program product accordingly.

Also, a system for processing radar signals is provided, the system including: a first radar unit that is arranged for emitting a first radar signal via its transmitting antenna, wherein the first radar signal is phase modulated using a first code and wherein a first frequency offset is added to at least a portion of the first radar signal; and a second radar unit that is arranged for emitting a second radar signal via its transmitting antenna, wherein the second radar signal is phase modulated using a second code, wherein the first code and the second code are orthogonal to each other, and wherein the first radar unit and the second radar unit are loosely coupled with each other. The first radar unit is arranged for receiving a combined radar signal via its receiving antenna, wherein the combined radar signal includes a reflection of the first radar signal and the second radar signal, and for processing the combined radar signal at the first radar unit.

A computer program product is suggested, which is directly loadable into a memory of a digital processing device, including software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for processing radar signals, the method comprising:
    emitting a first radar signal via a transmitting antenna of a first radar unit, wherein the first radar signal is phase modulated using a first code and wherein a first frequency offset is added to at least a portion of the first radar signal;
    emitting a second radar signal via a transmitting antenna of a second radar unit, wherein the second radar signal is phase modulated using a second code;
    wherein the first code and the second code are orthogonal to each other, and
    wherein the first radar unit and the second radar unit are loosely coupled with each other;
    receiving a combined radar signal via a receiving antenna of the first radar unit, wherein the combined radar signal comprises a reflection of the first radar signal and a reflection of the second radar signal; and
    processing the combined radar signal at the first radar unit.

2. The method according to claim 1, wherein the first radar signal comprises a predetermined number of chirps, wherein the first frequency offset is added to a selection of the predetermined number of chirps.

3. The method according to claim 1, wherein a second frequency offset is added to at least a portion of the second radar signal.

4. The method according to claim 3, wherein the second radar signal comprises a predetermined number of chirps, wherein the second frequency offset is added to a selection of the predetermined number of chirps.

5. The method according to claim 1, wherein the first frequency offset is set such that an intermediate frequency of the second radar signal is always positive over an entire spectrum of a cross path intermediate frequency.

6. The method according to claim 1, wherein processing the combined radar signal at the first radar unit comprises:
    converting the combined radar signal into a digital signal;
    conducting a first Fast Fourier Transform (FFT) based on the digital signal to generate an FFT output;
    conducting a first phase demodulation on the FFT output using the first code to generate a first output; and
    conducting a second phase demodulation on the FFT output using the second code and generating a second output.

7. The method according to claim 6, wherein the first FFT is a first stage FFT.

8. The method according to claim 7, wherein processing the combined radar signal at the first radar unit further comprises:
- conducting a second stage FFT based on the first output provided by the first phase demodulation to generate a second FFT output; and
- conducting the second stage FFT based on the second output provided by the second phase demodulation to generate a third FFT output.

9. The method according to claim 6, wherein processing the combined radar signal at the first radar unit further comprises:
- conducting a second FFT based on the first output provided by the first phase demodulation to generate a second FFT output; and
- conducting a third FFT based on the second output provided by the second phase demodulation to generate a third FFT output.

10. The method according to claim 1, wherein processing the combined radar signal at the first radar unit comprises:
- converting the combined radar signal into a digital signal;
- conducting a first phase demodulation based on the digital signal using the first code to generate a first output;
- conducting a second phase demodulation based on the digital signal using the second code to generate a second output;
- conducting a first stage Fast Fourier Transform (FFT) based on the first output provided by the first phase demodulation to generate a first FFT output; and
- conducting the first stage FFT based on the second output provided by the second phase demodulation to generate a second FFT output.

11. The method according to claim 10, wherein processing the combined radar signal at the first radar unit further comprises:
- conducting a second stage FFT based on the first FFT output to generate a third FFT output; and
- conducting the second stage FFT based on the second FFT output to generate a fourth FFT output.

12. The method according to claim 1, wherein an acquisition phase of the second radar unit is triggered via a signal conveyed from the first radar unit to the second radar unit.

13. The method according to claim 1, wherein an acquisition phase of the first radar unit and of the second radar unit is triggered via a signal conveyed from an electronic control unit.

14. A device for processing a combined radar signal, comprising:
- a transmitting antenna;
- a receiving antenna; and
- a processing unit, wherein the processing unit is configured to:
  - emit a first radar signal via the transmitting antenna, wherein a first frequency offset is added to at least a portion of the first radar signal, and wherein the first radar signal is phase modulated using a first code,
  - receive a combined radar signal via the receiving antenna, wherein the combined radar signal comprises a reflection of the first radar signal and a reflection of a second radar signal, wherein the second radar signal is emitted by a transmitting antenna of another radar unit, wherein the device and the other radar unit are loosely coupled with each other, and
  - process the combined radar signal by conducting a first phase demodulation using the first code and by conducting a second phase demodulation using the second code.

15. A system for processing radar signals comprising:
- a first radar unit comprising a first transmitting antenna and a receiving antenna, the first radar unit configured to emit a first radar signal via the first transmitting antenna, wherein the first radar signal is phase modulated using a first code, and wherein a first frequency offset is added to at least a portion of the first radar signal; and
- a second radar unit comprising a second transmitting antenna, the second radar unit configured to emit a second radar signal via the second transmitting antenna, wherein the second radar signal is phase modulated using a second code,
- wherein the first code and the second code are orthogonal to each other,
- wherein the first radar unit and the second radar unit are loosely coupled with each other, and
- wherein the first radar unit is configured to receive a combined radar signal via the receiving antenna, wherein the combined radar signal comprises a reflection of the first radar signal and a reflection of the second radar signal, and to process the combined radar signal.

16. A non-transitory computer readable medium comprising software code stored thereon which, when executed, causes a computer program to perform the steps of the method according to claim 1.

* * * * *